United States Patent [19]

Svensson et al.

[11] 4,194,796
[45] Mar. 25, 1980

[54] DEVICE FOR MAINTAINING A REQUIRED LIQUID PRESSURE IN A HYDROSTATIC BEARING

[75] Inventors: Bengt H. Svensson, Köpingebro; Lars G. Lindberg, Smedjebacken; Karl G. A. Hållstedt, Floda, all of Sweden

[73] Assignee: Aktiebolaget SKF, Goteborg, Sweden

[21] Appl. No.: 939,707

[22] Filed: Sep. 5, 1978

[51] Int. Cl.² .................... F16C 39/04; F16N 29/04; F01M 1/20
[52] U.S. Cl. .................... 308/9; 308/1 A; 308/122; 137/568; 184/6.4
[58] Field of Search ............. 308/1 A, 9, 78, 93, 308/107, 122, 170, 187, 240; 184/6.4, 27 A, 27 C; 137/568

[56] References Cited

U.S. PATENT DOCUMENTS

| 3,231,046 | 1/1966 | Ohrnberger | 308/9 |
| 3,288,166 | 11/1966 | Wagner | 137/568 |
| 3,637,048 | 1/1972 | Mount | 184/6.4 |
| 3,837,430 | 9/1974 | Decker et al. | 184/6.4 |

FOREIGN PATENT DOCUMENTS

| 1525813 | 7/1969 | Fed. Rep. of Germany | 137/568 |
| 2127478 | 12/1971 | Fed. Rep. of Germany | 308/9 |

*Primary Examiner*—Richard R. Stearns
*Attorney, Agent, or Firm*—Eugene E. Renz, Jr.

[57] ABSTRACT

This invention refers to a device for maintaining a required liquid pressure in a hydrostatic bearing during its slowdown time at pump failure for avoiding metallic contact between the cooperating bearing surfaces, which device incorporates an accumulator connected in the liquid supply system of the bearing and having means for maintaining a sufficient liquid pressure on the liquid contained in the accumulator.

4 Claims, 2 Drawing Figures

DEVICE FOR MAINTAINING A REQUIRED LIQUID PRESSURE IN A HYDROSTATIC BEARING

BACKGROUND OF THE INVENTION

In a hydrostatic bearing the cooperating bearing surfaces are spaced apart by means of a layer of a pressure liquid, usually oil. The required oil pressure is generated by a pump system. Such a bearing has a large load carrying capacity and low friction. Low friction, however, depends on constantly maintaining a predetermined required oil pressure during operation. If the pressure for any reason should cease, e.g. at current interruption, the electric pump motors will stop and a metallic contact will result producing a high friction at the cooperating bearing surfaces which can easily lead to breakdown, which, in turn, can result in large damages due to the usually large loads carried by the bearing. For security reasons, it is therefore necessary when current interruption occurs to ensure that the bearing is supplied with oil under sufficient pressure during a predetermined slow-down time period, that is, the time period which it takes to stop the member carried by the bearing.

It is for this purpose earlier known to accumulate a volume of oil under pressure, e.g. in a piston accumulator, which in principle consists of a cylinder wherein an axially freely moveable piston divides the cylinder volume in two parts, whereby oil in communication with the bearing pressure oil system is contained in one part of the cylinder and pressure gas in the other part thereof. The oil pressure and the gas pressure at each side of the freely moveable piston automatically will equalize themselves in order to balance the piston. As the gas is compressible, the gas volume thereby will vary in response to the oil pressure prevailing in the bearing, which bearing pressure in turn will vary in relation to the bearing load. The oil volume contained in the accumulator will hereby vary in response to the changes caused by the bearing load. The oil volume in the accumulator furthermore always must be sufficient for attending to the slow-down time. In bearings subjected to large load variations e.g. in mills, this means that the accumulator volume must be large and this volume is then only utilized to a very little part. The cost for the accumulator unit will therefore be considerable and it will amount to a large part of the entire cost of the bearing system. The required space is furthermore large. Other systems for preventing metallic contact between the bearing surfaces of hydrostatic bearings when pump failure occurs have been proposed. In accordance with these systems the pump system is connected to a fly wheel which will drive the pump during a predetermined time period after the current interruption. It has also been suggested to provide the supported member with auxiliary bearings, such as roller bearings, which operate or function when the pressure ceases in the hydrostatic bearing. Such solutions are however technically complicated, expensive and oftentimes of insufficient reliability

SUMMARY OF THE INVENTION

The purpose of the present invention is to provide a device of the type defined in the accompanying claim 1, which by means of a comparatively small accumulator will function with sufficient reliability also at very high bearing pressure variations. A space saving and safe device is obtained at a low cost. This is obtained according to the invention thereby that the device is given the characteristics appearing in the accompanying claim 1.

BRIEF DESCRIPTION OF THE DRAWINGS

The invention will hereinafter be further described with reference to the accompanying drawing, in which.

DESCRIPTION OF THE PREFERRED EMBODIMENTS

Figure 1:
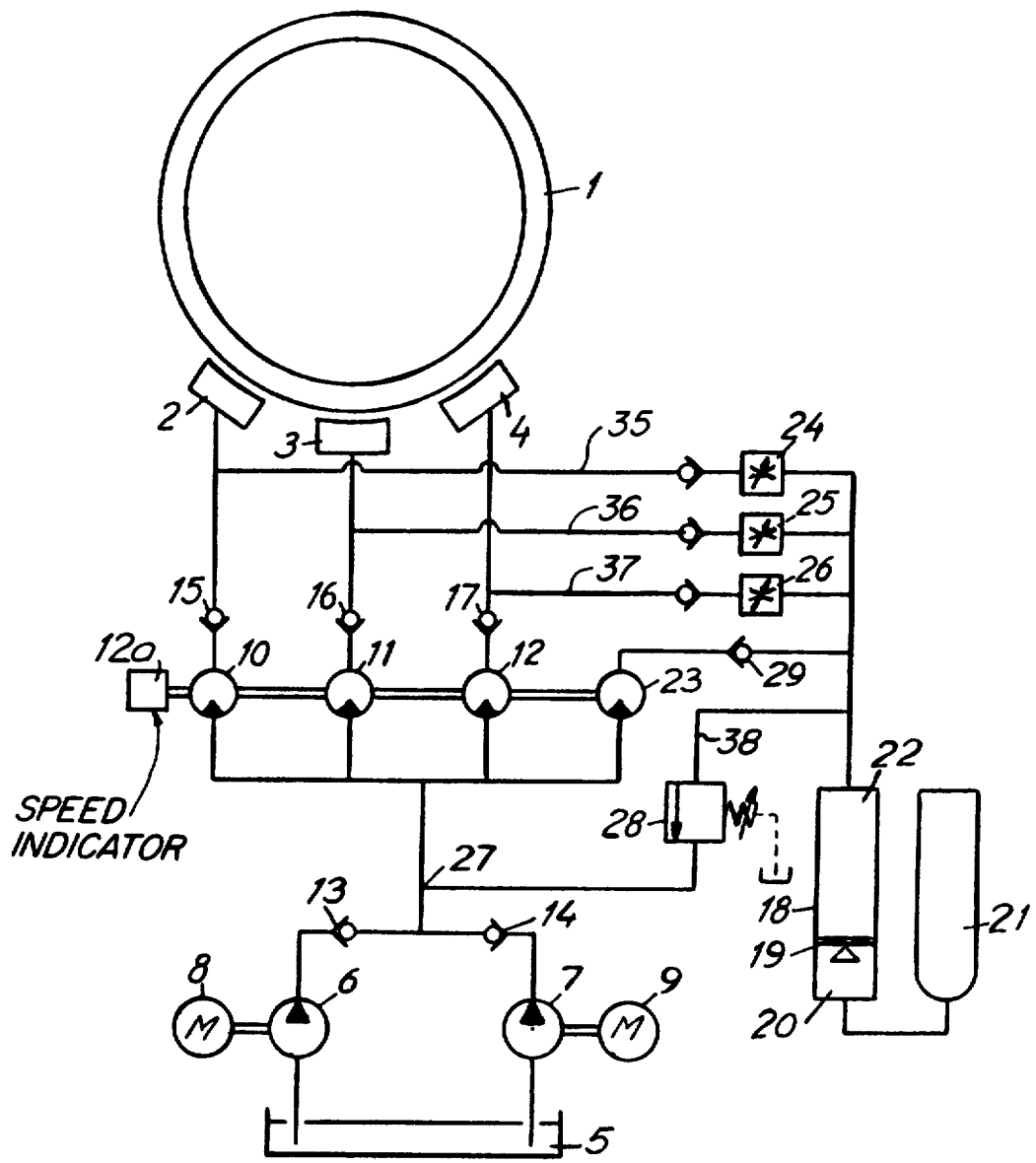
FIG. 1 and FIG. 2 show the principles for two different embodiments of the invention.

There is diagrammatically illustrated in FIG. 1 a bearing incorporating a rotatable ring 1, which is supported three hydrostatic bearing blocks 2, 3, 4. The blocks are fed with pressure oil from an oil container 5 via two pumps 6, 7 having one motor 8, 9 each and the oil flow is distributed between the blocks by a flow distribution member, which is known per se and which incorporates three interconnected metering units 10, 11, 12, which are designed as positive displacement pumps. A speed indicator 12a senses that a sufficient amount of oil always flows to the blocks 2, 3, 4. The leakage flow from the bearing is preferably led via a filtering device brackets not shown back to the container 5. In order to prevent oil from flowing backwards in the system, one-way valves 13, 14, 15, 16, 17 are arranged down-stream of each pump unit.

An accumulator which ascertains that oil under pressure is supplied to the blocks 2, 3, 4 during the slow-down time of the bearing at failure of the pumps 6, 7, incorporates a cylinder 18, the volume of which is divided into two chambers by means of an axially freely moveable piston 19. As the piston is freely moveable the pressure will always be equal in the two chambers. In one chamber 20, there is contained a pressure gas and this chamber is preferably connected to a particular pressure gas container 21 for ascertaining that the gas always has a sufficient pressure. The other chamber 22 is in a manner specified here below connected to the pressure oil system of the bearing and it is filled with oil. A portion of the oil flowing from the pumps 6, 7 against the bearing is lead through a particular pressure generating member, and in the embodiment according to figure 1, an additional metering unit 23 is provided in the flow distribution member, wherein the oil is given a pressure higher than the maximum pressure appearing in the bearing. Oil is lead from the metering unit 23 to each one of the bearing blocks 2,3, 4 via conduits 35,36 and 37 in which constant flow valves 24, 25, 26 are arranged. These valves are set in such a manner that only a part of the oil, which passes the metering unit 23, is lead to the bearing blocks 2, 3, 4. During normal running the remainder is led back to a position 27 upstream of the flow distribution member, in which position the oil pressure is lower than the oil pressure downstream of the metering unit 23. In order to make possible a setting of the desired oil pressure in the oil flowing from the metering unit 23, an adjustable constant pressure valve 28 is inserted in the return conduit 38 upstream of the position 27. This valve is set in such a manner that it will open at the pressure desired on the oil in chamber 22 of the accumulator. As long as the pressure is lower, e.g. at start, the valve is closed and as the flow through the unit 23 is larger than the flow through the units 24, 25, 26, the remainder of the oil will flow to chamber 22, which communicates with the metering unit 23 and with the return conduit 38 and with the conduits 35, 36 and 37. When the oil at start flows into the chamber 22, its volume will increase whereby the volume of the chamber 20 is reduced correspondingly, which means that the gas pressure will increase and so will also the pressure in the chamber 22. When the pressure reaches the pressure set on valve 28, this will open and the excess oil will flow through the return conduit 38 instead of to the accumulator, which during operation thus always will be charged with oil of the desired pressure. At failure of the pumps 6, 7, the flow through the flow distribution member 34 will stop and thus also through the metering unit 23, whereby the pressure downstreams of this will drop. The valve 28 will thereby close and oil is pressed out of the chamber 22 by the gas pressure in the chamber 20 through the conduits 35, 36 and 37 during such a long period of time that the rotatable ring 1 has time to stop before the pressure in the blocks 2, 3, 4 will become so low that metallic contact will occur between the blocks and the ring. A non-return valve 29 prevents oil from the accumulator to flow backwards through the metering unit 23. As it is possible to set the oil pressure in chamber 22 at the desired value by means of valve 28, which valve however shall exceed the maximum oil pressure in the bearing, the entire oil volume contained in chamber 22 will e.g. at pump failure, be supplied to the bearing with a required pressure. According to the present invention it is thus not necessary to make the accumulator unit any larger than needed for storing exactly oil volume required by the bearing during its slow-down time.

During the slow-down time of the bearing at pump failure, a flow from the accumulator is required which flow is preferably about at least 10% of the normal flow during operation at a given bearing load. The bearing shall furthermore be able to be driven without restrictions with only one of the pumps 6, 7 running i.e. with half the flow, in order to allow repair and service of one of the pump/motor units during operation of the bearing. Furthermore, it is required that the oil amount through the metering unit 23 also at half flow is at least 10% of the normal flow to the bearing i.e. at least as much as flows through valves 24, 25, 26 for securing that the pressure in the accumulator shall be maintained. This means that at normal operation with both pumps running, more than half of the oil pumped through the unit 23 will flow through the return conduit 38. Since, only about 25% of the total oil flow need to pass the unit 23, the total flow loss through the valves 24, 25, 26 and 28 will be rather small.

Figure 2:
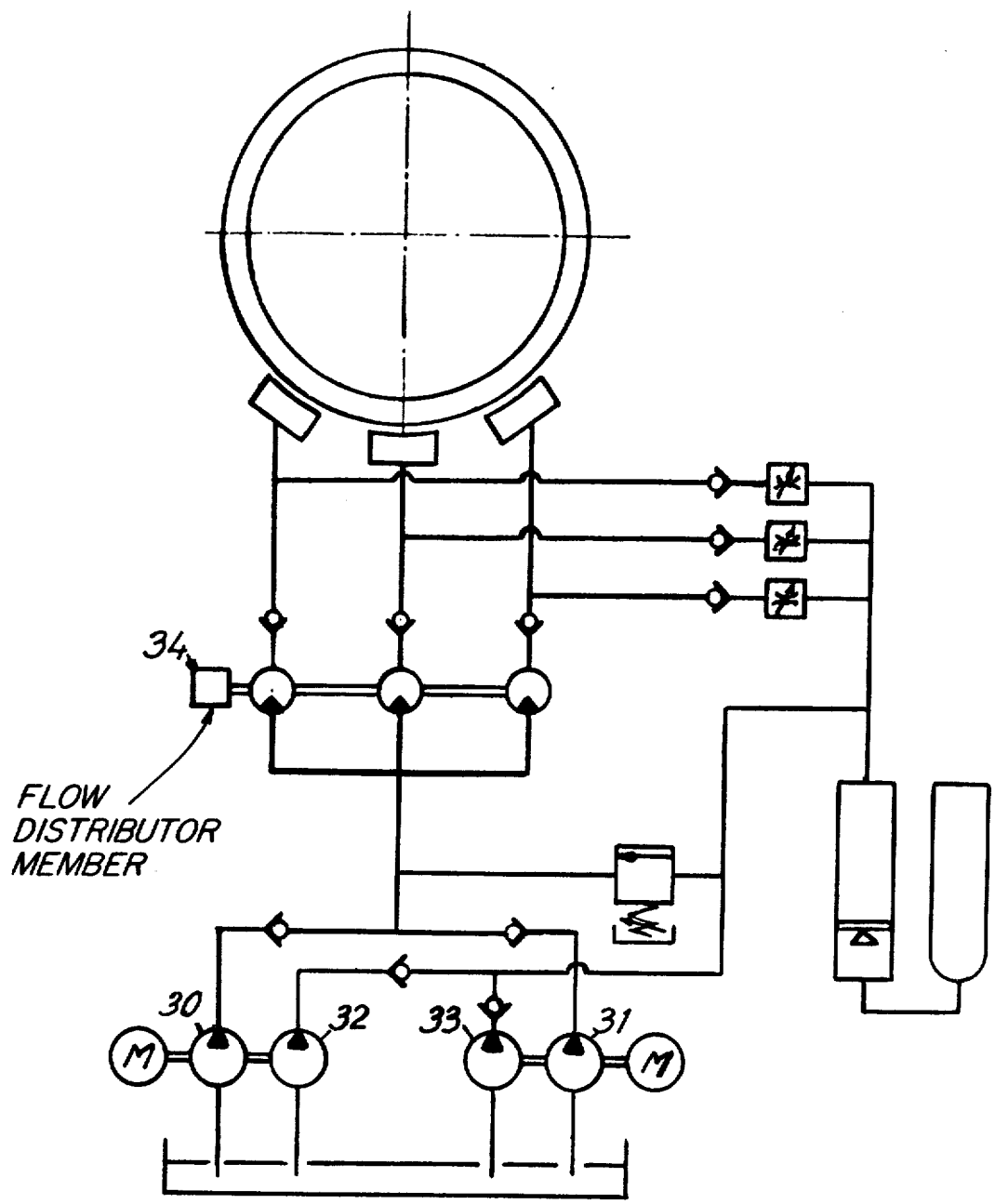

In FIG. 2 is shown a modified embodiment of a device according to the invention. The bearing and the hydraulic system have mainly the same design as those of FIG. 1 but the particular pressure generating member is, in this embodiment, designed as pump units 32, 33, which are connected to the main pumps 30, 31 instead of an additional metering unit in the flow distribution member 34. The other elements of the device correspond entirely to those described in FIG. 1 and the device operates in a corresponding manner.

It is also possible to use other embodiments of the invention within the scope of the appended claims. If, for instance, only one bearing block is used, the flow distribution member is not required and then preferably only a constant flow valve is used in the conduit between the particular pressure generating member and the bearing block. Instead of a flow distribution member of the type described hereabove it is, of course possible to use other systems e.g. restrictions in the conduits connected to each bearing block. It is also possible to arrange a particular driving motor for the pumps 10, 11, 12, 23 in FIG. 1 and 34 in FIG. 2, resp, which constitute flow distribution members.

We claim:

1. A device for maintaining a required liquid pressure in a hydrostatic bearing having a pump actuated liquid supply system during its slow-down time at pump failure, incorporating an accumulator (18, 22) connected in the liquid supply system of the bearing and having means (19, 20, 21) for maintaining a sufficient liquid pressure on the liquid contained in the accumulator, characterized thereby, that a portion of liquid in the system is led through a particular pressure generating member (23, 32, 33) in which it is given a pressure higher than the maximum liquid pressure in the bearing, that the accumulator (18, 22) is adapted to communicate with this portion of the pressure liquid whereby the liquid pressure inside the aummulator (18, 22) is, greater than the maximum liquid pressure in the bearing and that a part of said portion of the pressure liquid is led to the bearing via one or more constant flow valves (24, 25, 26) and the remainder to a lower pressure position (27) in the system via a return conduit provided with a one-way valve (28), adapted to open when the liquid pressure corresponds to said higher pressure.

2. A device as claimed in claim 1 intended for a hydrostatic bearing having a plurality of bearing pockets which are supplied with pressure liquid from a common pump system via a flow distribution member incorporating a number of interconnected metering units (10, 11, 12) designed as positive displacement pumps, characterized thereby, that an additional metering unit (23) is provided in the flow distribution member and acts as said particular pressure generating member.

3. A device as claimed in claim 1, characterized thereby, that the particular pressure generating member comprises of one or more pumps (32, 33) driven by the same motor or motors which drives/drive the main pump or main pumps and which pump/pumps have a lower pump capacity than the main pump or the main pumps respectively.

4. A device as claimed in claim 1 intended for a hydrostatic bearing having a plurality of bearing pockets, which are supplied with pressure fluid from a common pump system, characterized thereby, that the bearing pockets are each supplied with pressure liquid from the particular pressure generating member via its own conduit, each of which conduits is provided with its own constant flow valve (24, 25, 26), which values are dimensioned thus that the total flow through the vaLves is less than the flow through the particular pressure generating member (23, 32, 33).

* * * * *